United States Patent [19]

Larson et al.

[11] 3,805,086

[45] Apr. 16, 1974

[54] TOUCH SENSITIVE ELECTRONIC SWITCH

[75] Inventors: Willis A. Larson; Arthur Kimmell, both of Albuquerque, N. Mex.

[73] Assignee: Magic Dot, Inc., Minneapolis, Minn.

[22] Filed: June 23, 1972

[21] Appl. No.: 265,442

Related U.S. Application Data

[63] Continuation of Ser. No. 199,384, Nov. 16, 1971, abandoned.

[52] U.S. Cl. ............................ 307/116, 340/365 R

[51] Int. Cl. ............................................ H01h 3/00

[58] Field of Search..... 307/116; 340/365 R, 365 C; 200/DIG. 1, DIG. 2, 52

[56] References Cited

UNITED STATES PATENTS

| | | | |
|---|---|---|---|
| 3,705,424 | 12/1972 | Harvey, Jr. | 200/DIG. 2 |
| 3,307,071 | 2/1967 | Diamond | 315/160 |

FOREIGN PATENTS OR APPLICATIONS

| | | | |
|---|---|---|---|
| 652,974 | 9/1964 | Belgium | 200/DIG. 2 |
| 1,043,710 | 9/1966 | Great Britain | 200/DIG. 2 |
| 298,400 | 11/1965 | Netherlands | 200/DIG. 1 |

OTHER PUBLICATIONS

Johnson, IBM Technical Disclosure Bulletin, "Pushbutton With No Moving Parts," Vol. 13, No. 11, April 1971, (p. 3,551).

*Primary Examiner*—Robert K. Schaefer
*Assistant Examiner*—William J. Smith
*Attorney, Agent, or Firm*—Wicks & Nemer

[57] ABSTRACT

A touch sensitive electronic switch which has no moving parts and is actuated by the skin resistance of an operator causing a lowering of D.C. resistance across the switch is disclosed. The electronic switch, in the preferred embodiment shown, includes three electrodes laterally spaced and arranged with respect to each other upon an insulator. The second electrode is laterally spaced and insulated from the first electrode and arranged around and about the first electrode with the top surface of the second electrode rising above the level of the top surface of the first electrode. The third electrode is laterally spaced and insulated from both the first and second electrodes to provide a conductive electrical shielding electrode between the first and second electrodes. The first and second electrodes are exposed to the finger of an operator upon the top surface of the insulator in a manner that the operator's finger touching first the second electrode and then the first electrode allows a direct current path to be set up laterally between the first electrode and the second electrode to thereby provide a lowering of the D.C. resistance across the electronic switch. When the operator's finger is removed, the shielding effect of the third electrode prevents any leakage currents from flowing between the first electrode and the second electrode and establishing such a direct current path.

19 Claims, 3 Drawing Figures

PATENTED APR 16 1974

3,805,086

INVENTORS
Willis A. Larson,
Arthur Kimmell
BY
Wicks & Nemer
ATTORNEYS

TOUCH SENSITIVE ELECTRONIC SWITCH

This is a continuation of application Ser. No. 199,384 filed Nov. 16, 1971.

This invention is an improvement upon the subject matter disclosed and claimed in an application for Letters Patent filed in the name of Willis A. Larson and now U.S. Pat. No. 3,737,670 entitled "Touch Sensitive Electronic Switch" (hereinafter referred to as the "original application"). The present application is further a companion application to the applications for Letters Patent by: Willis A. Larson and Raymond M. Warner, Jr., Ser. No. 199,227, filed Nov. 16, 1971 and entitled "Composite D.C. Amplifier For Use With A Touch Sensitive Electronic Switch;" Willis A. Larson, Ser. No. 297,410, filed Oct. 13, 1972 which is a continuation of Ser. No. 199,195, filed Nov. 16, 1971 and entitled "Touch Sensitive Electronic Switch;" Willis A. Larson, Ser. No. 199,226 and now Pat. No. 3,715,540 and entitled "Touch Sensitive Electronic Switch;" and Willis A. Larson and Stephen R. Tell, Ser. No. 235,373 and now Pat. No. 3,728,501 and entitled "Touch Sensitive Electronic Switch."

BACKGROUND

This invention relates generally to electronic switching, more specifically to a touch sensitive electronic switch which has no moving parts and is actuated by the skin resistance of an operator lowering the D.C. resistance across the switch to provide a D.C. input signal to a D.C. amplifier.

In the above referred to original application by Willis A. Larson, the problem of avoiding a sufficiently conductive path across the switch due to surface contamination such that an undesired activation will occur was indicated as preventable by providing inaccessible vertical portions of annular conductor 7 to thereby avoid contact with the fingers. Thus, the original application taught long leakage paths in an attempt to minimize or prevent contamination from providing the undesired activation.

The present invention offers another solution which eliminates the problem of undesired actuation due to current leakage between the operative electrodes of the electronic switch due to face contamination.

SUMMARY

In summary a preferred embodiment of the present invention includes a first electrode immovably arranged within a housing and a second electrode also immovably arranged within the housing. The second electrode is further arranged around and about and laterally spaced and insulated from the first electrode. A third electrode is also immovably arranged within the housing in a spaced and insulated relationship with both the first and second electrodes and laterally between them. The first and second electrodes are exposed to the finger of an operator upon the top surface of the insulating media of the housing in a manner that the operator's finger touching the second electrode and then the first electrode allows a direct current path to be set up laterally between the second and the first electrode to thereby provide a lowering of the D.C. resistance across the electronic switch. When the operator's finger is removed, the shielding effect of the interposed third electrode prevents any leakage currents from flowing between the second electrode and the first electrode and establishing such a direct current path.

It is thus an object of the present invention to provide a touch sensitive electronic switch having extremely low leakage currents between electrodes to thus maintain the integrity of the switch in the OFF condition.

It is a further object of the present invention to provide an electronic switch where an electrode acts as a shield to prevent a flow of leakage current between other electrodes.

These and further objects and advantages of the present invention will become clearer in light of the following detailed description of an illustrative embodiment of this invention described in connection with the drawings.

DESCRIPTION

Figure 1:
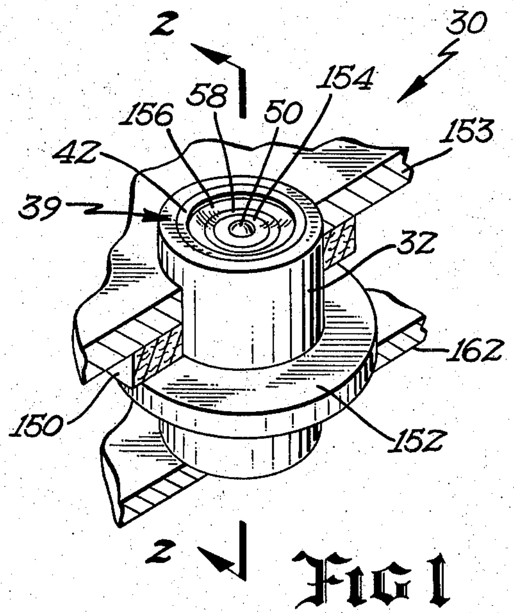
FIG. 1 shows a perspective view of the electronic switch of the present invention showing the disposition of the electrodes and housing especially adapted for printed circuit board use.
Figure 2:
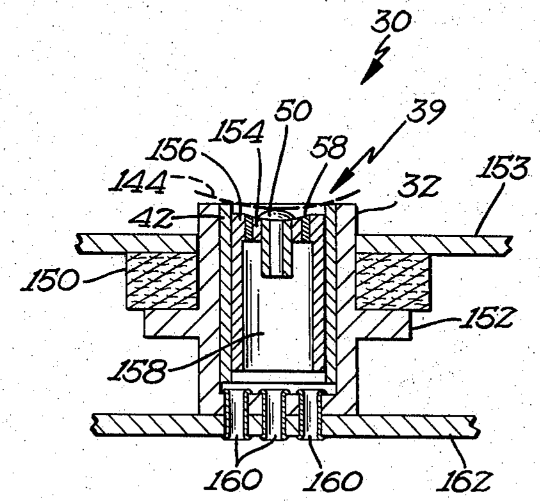
FIG. 2 is a cross section taken along the lines 2—2 of the housing illustrated in FIG. 1.

In FIGS. 1 and 2, a switch 30 is shown as including a housing 32, which may be made of any suitable durable insulating material, and a switch face 39. Switch 30 is shown as it would be utilized with a printed wiring board. A dust seal 150 of foam rubber or the like is placed between a flange 152 of housing 32 and a panel 153 through which the housing extends for manual access.

As best shown in FIG. 1, the electronic switch electrodes comprise an input, first or center electrode 50, a supply, second, or annular electrode 42, and a reference, third, or ground electrode 58. Center electrode 50, annular electrode 42, and ground electrode 58 are separated, insulated, and held in their respective positions by insulating rings 154 and 156 in a manner that insulating ring 154 separates electrodes 50 and 58, and insulating ring 156 separates electrodes 58 and 42. It will be observed in FIG. 2 that the insulating rings 154 and 156 take the form of hollow cylinders to provide a chamber 158 into which the electronic components of a high gain D.C. amplifier may be placed, as set out herein. Three hollow conductors 160 are imbedded in the bottom portion of housing 32 to provide communication to chamber 158. The hollow conductors permit leads to be brought from the chamber 158 to the lower surface of a printed wiring board 162 where they may be soldered into place in the usual manner. The solder will also adhere to the hollow conductors 160 to provide a certain degree of mechanical strength in attaching the electronic switch to the printed wiring board 162.

The particular arrangement of the three electrodes 42, 50, and 58 of the elctronic switch 30 of the present invention may now be explained. As is shown in the figures, center electrode 50 is laterally immovably arranged with the insulating ring 154, with a top surface of electrode 50 exposed to the finger of an operator upon the top surface of insulating ring 154. Annular electrode 42 is also laterally immovably arranged with the insulating material of housing 32 and the insulating ring 156, and with electrode 50, and is arranged laterally around and about and insulated from electrode 50 in a manner to expose the top surface of the annular electrode 42 to the finger of the operator upon the top surface of its surrounding insulating material. The level of the top surface of the annular electrode 42 is further arranged above the level of the top surface of the center electrode 50 in a manner that the finger of the operator touches the second electrode 42 before contact is made between the finger and the center electrode 50 to thereby allow good contact of the operator's finger with the annular electrode 42 before contact is made with the center electrode 50 and thereby allow the harmless grounding of the usual alternating voltage induced from an external source into an operator's body. This arrangement of electrodes also allows a direct current path to be set up laterally between the center electrode 50 and the annular electrode 42 as soon as the finger of the operator touches the center electrode 50.

Ground electrode 59 is also laterally immovably arranged with its surrounding insulating media, insulating rings 154 and 156, and with the center and annular electrodes. Ground electrode 58 is further arranged laterally between the center and annular electrodes and around the center electrode and is insulated from both electrodes as a conductive electrical shield electrode allowing leakage current which could otherwise flow between the center electrode and the annular electrode to be conducted to a reference point through the ground electrode 58 to thus aid in preventing the flow of leakage current between center electrode 50 and annular electrode 42 which would otherwise tend to set up a non-actuated direct current path from the center electrode to the annular electrode. Thus, a non-actuated direct current path between the first and second electrodes is one such as may be caused by leakage current in the switch and not by a touching of the switch face by the operator's finger or other external cause.

Figure 3:
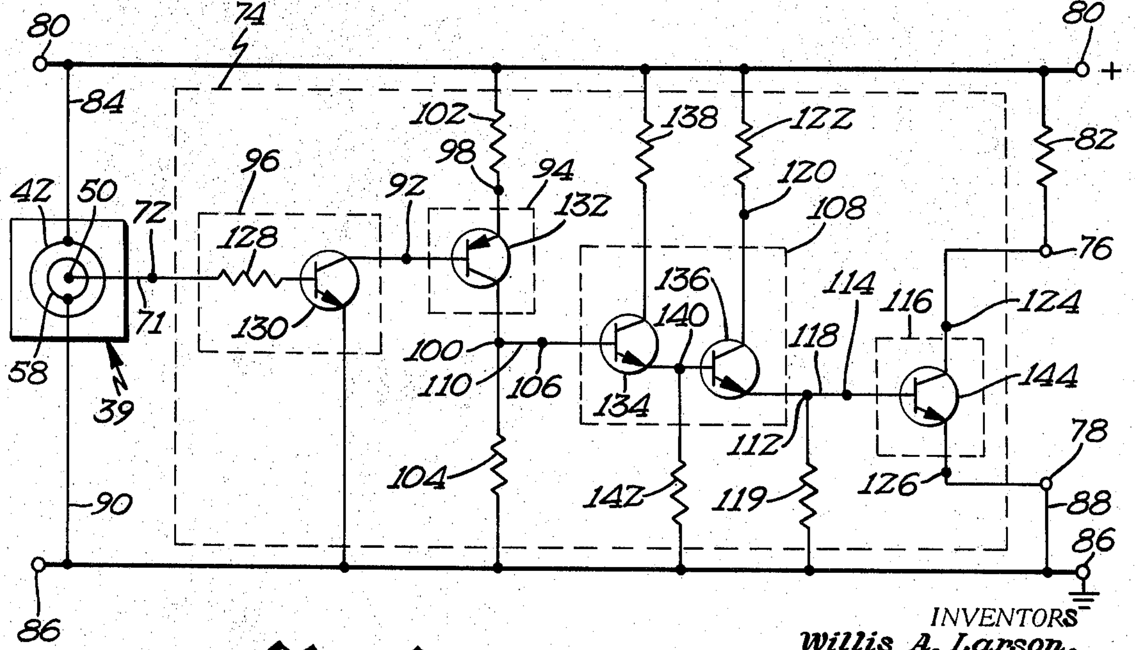
FIG. 3 shows a schematic representation of electronic circuitry for use with the electronic switch of FIG. 1.

In FIG. 3, switch face 39 is shown in schematic form with supply electrode 42, input electrode 50, and ground electrode 58 also schematically represented.

Input electrode 50 is connected by a lead 71 to input 72 of a composite amplifier, generally designated 74, including outputs 76 and 78. Output 76 is connected to a first terminal 80 of a D.C. voltage source or supply through resistor 82 representing an electrical load. Supply terminal 80 is also connected to a supply electrode 42 through a lead 84. Output 78 is connected to a second supply terminal 86 of the D.C. voltage supply through a connection 88. Terminal 86 is further connected to ground electrode 58 by a connection 90. The D.C. voltage source, not specifically shown, includes the first and second terminals 80 and 86, and provides direct current to amplifier 74. As shown in the preferred embodiment of FIG. 3, terminal 86 is a common, ground, or reference terminal, and terminal 80 is of a positive D.C. voltage differing from the voltage at 86.

Input 72 to composite amplifier 74 is connected to input 92 of a first amplifier 94 through a buffer amplifier 86. First amplifier 94 further includes two outputs in the form of junction points 98 and 100. A current limiting resistor 102 is connected between junction point 98 and supply terminal 80, and a leakage prevention resistor 104 is connected between junction point 100 and supply terminal 86. Junction point 100 is further connected to an input junction point 106 of a second amplifier 108 through a lead 110. Second amplifier 108 includes an output junction point 112 connected to an input junction point 114 of a third amplifier 116 by a lead 118 and to supply terminal 86 by another leakage prevention resistor 119. Second amplifier 108 further includes output junction point 120 connected to supply terminal 80 by a current limiting and parasitic oscillation reducing resistor 122. Third amplifier 116 includes an output junction point 124 connected to output 76 of amplifier 74 and an output junction point 126 connected to output 78 of amplifier 74.

Buffer amplifier 96 includes a base current limiting resistor 128 connected between input 72 and the base of an NPN transistor 130. Transistor 130 has its emitter connected to supply terminal 86 and its collector connected to input junction point 92 of first amplifier 94.

First amplifier 94 includes PNP transistor 132 having its base connected to junction point 92, its emitter connected to junction point 98, and its collector connected to junction point 100.

Second amplifier 108 includes two amplifying stages in the form of NPN transistors 134 and 136 connected in a Darlington type arrangement. First Darlington transistor 134 has a base connected to junction point 106, a collector connected to supply terminal 80 through another current limiting and oscillation reducing resistor 138. The emitter of transistor 134 provides an output current to the base of the second Darlington transistor 136 through junction point 140. Second Darlington transistor 136 has its emitter connected to junction point 112, and its collector connected to junction point 120.

A leakage prevention resistor 142 is connected between junction point 140 and supply terminal 86.

Third amplifier 116 includes NPN transistor 144 with its base connected to junction point 114, its collector connected to junction point 124, and its emitter connected to junction point 126.

OPERATION

Generally, in operating the touch sensitive electronic switch 30 shown in FIGS. 1 and 2, the finger of an operator is placed upon the switch face 39, for example as shown by the finger portion 144 shown in FIG. 2. The electrical skin resistance of the operator causes a direct current path to be set up between input electrode 50 and supply electrode 42 to thus cause a small current to flow between these electrodes. The current flowing is generally in the nanoampere range (30–300 nanoamperes) with normal skin resistances and supply voltages of approximately 5 volts. This D.C. input current is amplified by the various stages of composite amplifier 74 shown in FIG. 3 to a point where output transistor 144 saturates and approximates an electronic switch in the closed or ON condition to the electrical load 82 also connected across supply terminals 80 and 86. When the operator's finger 144 is removed from switch 30, the characteristics of the switch prevent input current from reaching input 72 of composite amplifier 74 and rapidly render the amplifying stages to and including output transistor 144 nonconducting. Thus, with the operator's finger removed from switch 30, composite amplifier 74 appears as an electrical switch in an open or OFF condition to load 82, and no current is allowed to flow in the electrical load.

In particular, grounding electrode 58 is connected to a reference point within direct current amplifier 74. That is, ground electrode 58 is connected to the lowest potential point in the electronic circuit to which the input electrode 50 and supply electrode 42 are connected. By its interposition between the input electrode 50 and the supply electrode 42, leakage current attempting to flow between the input electrode 50 and the supply electrode 42 first encounters the conductive electrical shielding effect of ground electrode 58 and is conducted to such reference or ground. Thus, the electrical shielding of ground electrode 58 prevents a flow of leakage current between the input electrode and the supply electrode tending to set up a direct current path from the input electrode to the supply electrode without actuation of the switch by the finger of an operator, which is an undesired actuation of the electronic switch 30.

It is not necessary, however, that electrode 58 be connected to the ground point in the D.C. amplifier. Electrode 58 may be connected to any potential supply of a voltage below that of the supply voltage to the amplifier and yet provide some shielding. It is apparent, however, that the maximum shielding is provided when electrode 58 is in fact connected to the reference, ground, or common point of the D.C. amplifier to which switch 30 is connected.

As an example of the effectiveness of ground electrode 58, the original application discloses an electronic switch which requires a surface resistivity across the switch of greater than 1,000 megohms, with a 5 volt supply voltage and a D.C. amplifier of a gain of $10^6$, in order to maintain a nonactuated output current below 5 milliamperes. With the shielding effect of electrode 58 of the present invention, a conductivity across switch 30 as low as 20 megohms with a 5 volt supply and again a D.C. amplifier of a gain of $10^6$ will result in an output current in the nanoampere range which is solely determined by the leakage current of the last amplifier stage.

It is to be noted that actuation of the switch 30 of the present invention is made without moving parts, aside from movement of the operator's finger. That is, each of the supply electrode 42 and input electrode 50 is laterally immovably attached to housing 32. Laterally immovably attached for the purposes of this invention is defined as where the input and supply electrodes are fixed with respect to each other in a manner to prevent the input electrode from coming into direct electrical contact with the supply electrode. Either electrode may be made vertically movable, as by using a soft or spongy material or springs to give the effect or feeling of vertical movement to an operator's finger. Other means for effecting this illusion of vertical movement upon actuation will be envisioned by those skilled in the art.

Thus, since the invention disclosed herein may be embodied in other specific forms without departing from the spirit or general characteristics thereof, some of which forms have been indicated, the embodiment described herein is to be considered in all respects illustrative and not restrictive. The scope of the invention is indicated by the appended claims, rather than by the foregoing description, and all changes which come within the meaning and range of equivalency of the claims are intended to be embraced therein.

What is claimed is:

1. Electronic switch apparatus operable by the lateral bridging of the switch electrodes by the skin resistance of an operator, comprising in combination:

insulating media having a top surface;

first electrode means laterally immovably arranged with the insulating media with the top surface of the first electrode exposed to the finger of an operator upon the top surface of the insulating media;

second electrode means laterally immovably arranged with the insulating media and the first electrode laterally around and about, spaced, and insulated from the first electrode with the top surface of the second electrode exposed to the finger of an operator upon the top surface of the insulating media laterally from the first electrode and with the top surface of the second electrode arranged above the level of the top surface of the first electrode in a manner that the finger of an operator touches the second electrode before contact is made between the finger and the first electrode to thereby allow good contact of the operator's finger with the second electrode before contact is made with the first electrode and thereby allow the harmless discharge of voltage in an operator's body and allow a direct current path to be set up laterally between the first electrode and the second electrode as soon as the finger of the operator touches the first electrode;

third electrode means laterally immovably arranged with the insulating media, with the first electrode, and with the second electrode laterally between the first and second electrodes and around and about the first electrode, spaced, and insulated from both the first and second electrodes as a conductive electrical shielding electrode allowing leakage current flowing between the first electrode and the second electrode to be conducted to a reference point to aid in preventing a flow of leakage current between the first electrode and second electrode tending to set up a non-actuated direct current path from the first electrode to the second electrode;

first means for providing an electrical connection to the first electrode;

second means for providing an electrical connection to the second electrode;

and third means for providing an electrical connection to the third electrode.

2. The electronic switch apparatus of claim 1, wherein the first connection means comprises means for providing an electrical connection between the first electrode and the input of a D.C. amplifier.

3. The electronic switch apparatus of claim 2, wherein the third connection means comprises means for providing an electrical connection between the third electrode and a reference point within the D.C. amplifier.

4. The electronic switch apparatus of claim 3, wherein the second connection means comprises means for providing an electrical connection between the second electrode and a means for supplying D.C. voltage to the D.C. amplifier.

5. Electronic switch apparatus operable by the lateral bridging of the switch electrodes by the skin resistance of an operator's finger, comprising in combination:

at least three switch electrodes arranged and insulated from each other with the first switch electrode and the second switch electrode laterally immovably fixed with respect to each other in a manner to prevent the first switch electrode from coming into direct electrical contact with the second switch electrode and with the top surfaces of the first switch electrode and second switch electrode exposed to the finger of an operator for allowing an operator's finger to touch both the first electrode and the second electrode to lower the D.C. resistance between the first electrode and the second electrode and with the third switch electrode arranged laterally between the first switch electrode and the second switch electrode, laterally immovable, and insulated from each of the first electrode and second electrode as a conductive electrical shielding electrode preventing by its presence a flow of electrical current between the first electrode and the second electrode;

first electrical means for providing a connection to the first electrode;

second electrical means for providing a connection to the second electrode;

third electrical means for providing a connection to the third electrode.

6. The electronic switch apparatus of claim 5, wherein the first connection means comprises means for providing an electrical connection between the first electrode and the input of a D.C. amplifier.

7. The electronic switch apparatus of claim 6, wherein the third connection means comprises means for providing an electrical connection between the third electrode and a reference point within the D.C. amplifier.

8. The electronic switch apparatus of claim 7, wherein the second connection means comprises means for providing an electrical connection between the second electrode and a means for supplying D.C. voltage to the D.C. amplifier.

9. Electronic switch apparatus operable by the lateral bridging of the switch electrodes by the skin resistance of an operator, comprising in combination:

insulating media having a top surface;

first electrode means laterally immovably arranged with the insulating media with the top surface of the first electrode exposed to the finger of an operator upon the top surface of the insulating media;

second electrode means laterally immovably arranged with the insulating media and the first electrode laterally around and about, spaced, and insulated from the first electrode with the top surface of the second electrode exposed to the finger of an operator upon the top surface of the insulating media laterally from the first electrode;

third electrode means laterally immovably arranged with the insulating media, with the first electrode, and with the second electrode, electrically between the first and second electrodes and spaced and insulated from both the first and second electrodes as a conductive electrical shielding electrode allowing leakage current flowing between the first electrode and the second electrode to be conducted to a reference point to aid in preventing a flow of leakage current between the first electrode and the second electrode tending to set up a non-actuated direct current path from the first electrode to the second electrode;

first means for providing an electrical connection to the first electrode;

second means for providing an electrical connection to the second electrode;

and third means for providing an electrical connection to the third electrode.

10. The electronic switch of claim 9, wherein the top surface of the second electrode is arranged above the level of the top surface of the first electrode in a manner that the finger of an operator touches the second electrode before contact is made between the finger and the first electrode to thereby allow good contact of the operator's finger with the second electrode before contact is made with the first electrode and thereby allow the harmless discharge of voltage in an operator's body and allow a direct current path to be set up laterally between the first electrode and the second electrode as soon as the finger of the operator touches the first electrode.

11. The electronic switch apparatus of claim 10, wherein the first connection means comprises means for providing an electrical connection between the first electrode and the input of a D.C. amplifier.

12. The electronic switch apparatus of claim 10, wherein the third connection means comprises means for providing an electrical connection between the third electrode and a reference point within the D.C. amplifier.

13. The electronic switch apparatus of claim 10, wherein the second connection means comprises means for providing an electrical connection between the second electrode and a means for supplying D.C. voltage to the D.C. amplifier.

14. Electronic switch apparatus operable by the lateral bridging of the switch electrodes by the skin resistance of an operator's finger, comprising in combination:

at least three switch electrodes arranged and insulated from each other with the first switch electrode and the second switch electrode laterally immovably fixed with respect to each other in a manner to prevent first switch electrode from coming into direct electrical contact with the second switch electrode and with the top surfaces of the first switch electrode and second switch electrode exposed to the finger of an operator for allowing an operator's finger to touch both the first electrode and the second electrode to lower the D.C. resistance between the first electrode and the second electrode and with the third switch electrode arranged electrically between the first switch electrode and the second switch electrode, laterally immovable, and insulated from each of the first electrode and second electrode as a conductive electrical shielding electrode preventing by its presence a flow of electrical current between the first electrode and the second electrode; first electrical means for providing a connection to the first electrode;

second electrical means for providing a connection to the second electrode;

third electrical means for providing a connection to the third electrode.

15. The electronic switch apparatus of claim 14, wherein the first connection means comprises means for providing an electrical connection between the first electrode and the input of a D.C. amplifier.

16. The electronic switch apparatus of claim 15, wherein the third connection means comprises means for providing an electrical connection between the third electrode and a reference point within the D.C. amplifier.

17. The electronic switch apparatus of claim 16, wherein the second connection means comprises means for providing an electrical connection between the second electrode and a means for supplying D.C. voltage to the D.C. amplifier.

18. The electronic switch apparatus of claim 14 wherein the third connection means comprises means for providing an electrical connection between the third electrode and a reference point within the D.C. amplifier.

19. The electronic switch apparatus of claim 14, wherein the second connection means comprises means for providing an electrical connection between the second electrode and a means for supplying D.C. voltage to the D.C. amplifier.

* * * * *